(12) United States Patent
Kokkinen et al.

(10) Patent No.: US 8,824,315 B2
(45) Date of Patent: Sep. 2, 2014

(54) METHOD AND APPARATUS FOR DATA OFFLOADING

(75) Inventors: Heikki Kokkinen, Helsinki (FI); Mika Rinne, Espoo (FI); Sami Kekki, Helsinki (FI)

(73) Assignee: Nokia Corporation, Espoo (FI)

( * ) Notice: Subject to any disclaimer, the term of this patent is extended or adjusted under 35 U.S.C. 154(b) by 483 days.

(21) Appl. No.: 12/890,484

(22) Filed: Sep. 24, 2010

(65) Prior Publication Data
US 2011/0317571 A1    Dec. 29, 2011

(30) Foreign Application Priority Data
Jun. 28, 2010  (GB) .................................. 1010821.5

(51) Int. Cl.
| H04L 1/00 | (2006.01) |
| H04W 92/02 | (2009.01) |
| H04W 24/00 | (2009.01) |
| H04W 28/18 | (2009.01) |
| H04W 24/10 | (2009.01) |

(52) U.S. Cl.
CPC .............. *H04W 92/02* (2013.01); *H04W 28/18* (2013.01); *H04W 24/10* (2013.01); *H04W 24/00* (2013.01)
USPC ...................................................... 370/252

(58) Field of Classification Search
None
See application file for complete search history.

(56) References Cited

U.S. PATENT DOCUMENTS

| 2011/0188376 A1* | 8/2011 | Stupar et al. ................... 370/235 |
| 2013/0088966 A1* | 4/2013 | Mahkonen et al. ........... 370/235 |

FOREIGN PATENT DOCUMENTS

| WO | WO 2010/037422 A1 | 4/2010 |
| WO | WO 2010/080966 A1 | 7/2010 |
| WO | WO 2011/088406 A1 | 7/2011 |
| WO | WO 2011/134496 A1 | 11/2011 |

OTHER PUBLICATIONS

"OMA Device Management Standardized Objects", Open Mobile Alliance Ltd., Jun. 17, 2008.
3GPP TS 23.402 V10.0.0 (Jun. 2010), Technical Specification, 3$^{rd}$ Generation Partnership Project; Technical Specification Group Services and System Aspects; Architecture Enhancements for non3GPP Accesses (Release 10), (pp. 1, 17, 43-46).
http://www.readwriteweb.com/archives/mobile_data_traffic_surge_40_exabytes_by_2014.php, (Aug. 10, 2012), (6 pages).
http://en.wikipedia.org/wiki/Mobile_data_offloading, (09/099/2010), (5 pages).
http://www.notava.com/notava/index.php?page=products, (Sep. 9, 2010), (16 pages).
Mobile Alliance—SyncML Representation Protocol, Approved Version 1.2, (2007), (60 pages).
Mobile Alliance—OMA Device Management Protocol, Approved Version 1.2.1, (2008), (53 pages).

(Continued)

*Primary Examiner* — Chi Pham
*Assistant Examiner* — Kouroush Mohebbi
(74) *Attorney, Agent, or Firm* — Harrington & Smith (57) ABSTRACT

In accordance with an example embodiment of the present invention, a method comprises receiving data dependent offloading parameters at a mobile device, measuring data amount usage of the mobile device, comparing the measured data amount usage to the received data dependent offloading parameters, and determining whether to attempt offloading of data from the mobile device to a complementary network based on the comparison.

17 Claims, 7 Drawing Sheets

(56) References Cited

OTHER PUBLICATIONS

Mobile Alliance—OMA Device Management Tree and Description, Approved Version 1.2.1, (2008), (48 pages).
Mobile Alliance—OMA Device Management Representation Protocol, Approved Version 1.2.1, (2008), (47 pages).

3GPP TS 24.312 v9.10 (Mar. 2010), Technical Specification, $3^{rd}$ Generation Partnership Project; Technical Specification Group Core Network and Terminals; Access Network Discovery and Selection Function (ANDSF) Management Object (MO), (Release 9), (85 pages).

* cited by examiner

METHOD AND APPARATUS FOR DATA OFFLOADING

TECHNICAL FIELD

The present application relates generally to data offloading in a wireless communication network.

BACKGROUND

An exponential growth in data traffic is expected in mobile data networks. So called "Smart phone" devices as well laptop and other mobile computing devices are becoming a major source of mobile data traffic. The explosion of Internet and other data traffic on wireless networks has created an increasing need for offloading data traffic.

Mobile data offloading, also called data offloading, is the use of complementary network technologies, such as wireless local area networks ("WLAN"), for delivering data originally targeted for cellular networks. WLAN networks are typically hotspot networks and they are thus not available everywhere. Thus, in order to use WLAN networks, a mobile device typically need to constantly scan its environment in order to determine if a WLAN network is available for use by the mobile device.

SUMMARY

Various aspects of examples of the invention are set out in the claims.

According to a first aspect of the present invention, an apparatus comprises at least one communications interface for receiving data dependent offloading parameters at a mobile device, a data counter in the mobile device for measuring data usage of the mobile device, and an offload selection function in the mobile device for comparing the received data dependent offloading parameters to the measured data usage and for determining whether to attempt offloading of data from the mobile device to a complementary network based on the comparison.

According to a second aspect of the present invention, a method comprises receiving data dependent offloading parameters at a mobile device, measuring data amount usage of the mobile device, comparing the measured data amount usage to the received data dependent offloading parameters, and determining whether to attempt offloading of data from the mobile device to a complementary network based on the comparison According to a third aspect of the present invention, a computer program product comprises a computer-readable medium bearing computer program code embodied therein for use with a computer, the computer program code comprising code for receiving data dependent offloading parameters at a mobile device, code for measuring data amount usage of the mobile device, code for comparing the measured data amount usage to the received data dependent offloading parameters, and code for determining whether to attempt offloading of data from the mobile device to a complementary network based on the comparison.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 8 of the drawings.

Figure 1:
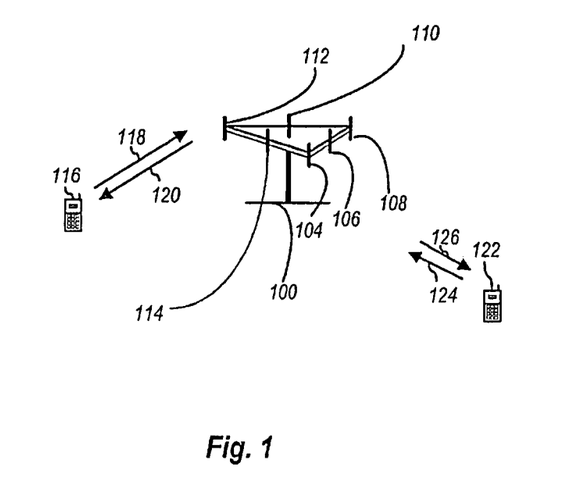
FIG. 1 is a diagram of a system that can be used to implement various aspects of one embodiment of the invention.

Turning now to the drawings, FIG. 1 shows a system 10 in which various embodiments can be utilized, comprising multiple communication devices that can communicate through one or more networks. The system 10 may comprise any combination of wired or wireless networks including, but not limited to, a mobile telephone network (e.g., Global System for Mobile Communications (GSM), Wideband Code Division Multiple Access (W-CDMA), Code Division Multiple Access (CDMA), Long Term Evolution (LTE), Ultra Mobile Broadband (UMB), High Rate Packet Data (HRPD), and Worldwide Interoperability for Microwave Access (WiMax)), a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile network 11 and the Internet 28. Connectivity to the Internet 28 may include, but is not limited to, long range wireless connections, cellular mobile network connections, short range wireless connections, and various wired connections including, but not limited to, xDSL-lines, Ethernet, telephone lines, cable lines, power lines, and the like.

The exemplary communication devices or UEs of the system 10 may include, but are not limited to, an electronic device 12, a combination personal digital assistant (PDA) and mobile telephone 14, a PDA 16, an integrated messaging device (IMD) 18, a desktop computer 20, a notebook computer 22, a laptop computer, a smart phone, a communicator, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. or devices may be wearable by a person, such as clothing, sports or adventure equipment. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, CDMA, GSM, Universal Mobile Telecommunications System (UMTS), Time Division Multiple Access (TDMA), Frequency Division Multiple Access (FDMA), WiMax, Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 2:
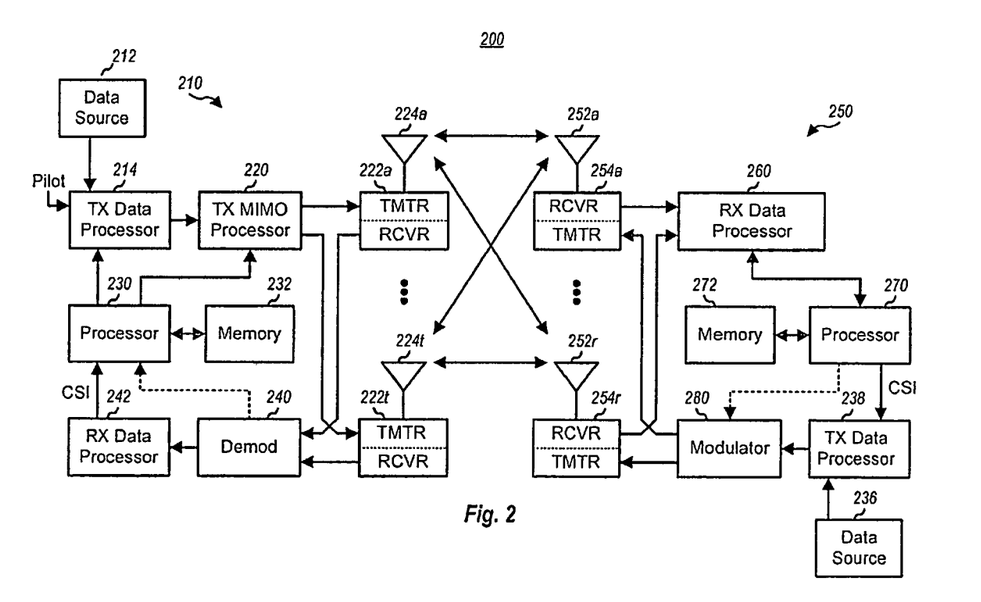
FIG. 2 is an illustration of an electronic device that can be used to implement various aspects of one embodiment of the invention.
Figure 3:
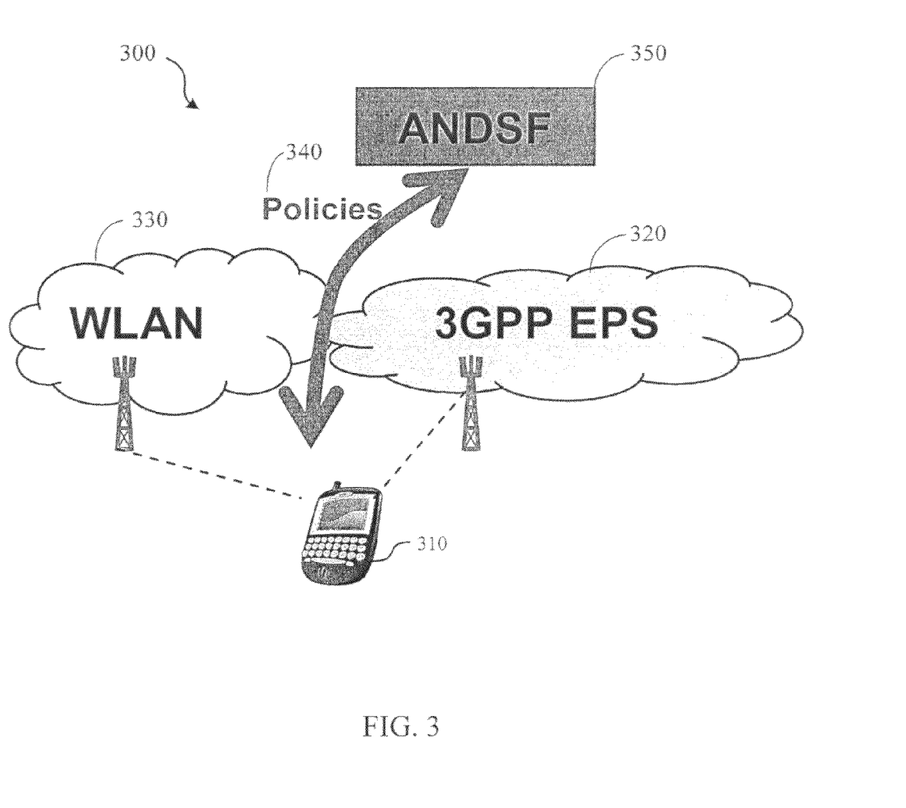
FIG. 3 is a block diagram of an electronic device that can be used to implement various aspects of one embodiment of the invention.

FIGS. 2 and 3 show one representative electronic device, or UE 12 within which various embodiments may be implemented and/or used in conjunction with the implementation of various embodiments. It should be understood, however, that the various embodiments are not necessarily intended to be limited to one particular type of device. The electronic device or UE 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art.

Figure 4:
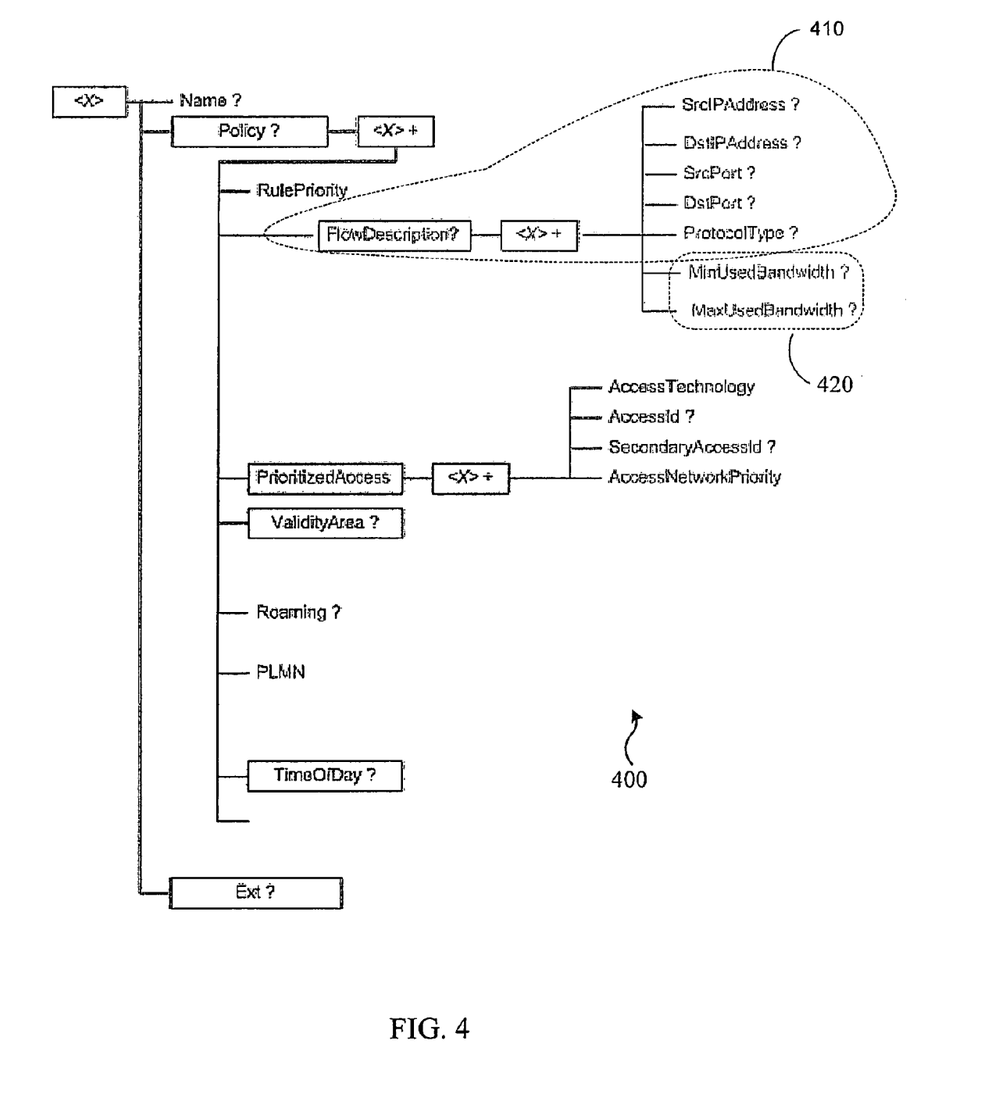
FIG. 4 is a diagram of a chip set that can be used to implement various aspects of one embodiment of the invention.

FIG. 4 is another representative electronic device within which various embodiments may be implemented and/or used in conjunction with implementation of various embodiments. The electronic device or chip set 60 includes a processor 62, a digital signal processor 64, an application specific integrated circuit ASIC 66, memory 68, and a bus 70. The bus 70 can act as a communication mechanism among the components (64, 66, and 68) of the chip set 60. The processor 64 can be configured for executing instructions and processing information stored in, for example, the memory 68. The processor 64 may include one or more processing cores and each core can be configured to perform independently. A multi-core processor enables multiprocessing within a single physical package. Examples of a multi-core processor include two, four, eight, or greater numbers of processing cores. Alternatively, or in addition, the processor 64 may include one or more microprocessors configured in tandem via the bus 70 to enable independent execution of instructions, pipelining, and multithreading. The processor 62 may also be accompanied with one or more specialized components to perform certain processing functions and tasks such as one or more digital signal processors (DSP) 64, or one or more application-specific integrated circuits (ASIC) 66.

A DSP 64 typically is configured to process real-word signals (e.g., sound) in real time independently of the processor 62. Similarly, an ASIC 66 can be configured to perform specialized functions not easily performed by a general purposed processor. Other specialized components to aid in performing the inventive functions described herein can include one or more field programmable gate arrays (FPGA), one or more controllers, or one or more other special-purpose computer chips not shown in FIG. 4.

The processor 62 and accompanying components can have connectivity to the memory 68 via the bus 70. The memory 68 can include both dynamic memory (e.g., RAM, magnetic disk, writable optical disk, etc.) and/or static memory (e.g., ROM, SD-ROM, etc.) for storing executable instructions that when executed can perform the inventive steps described herein. The memory 68 can also store the data associated with or generated by the execution of the inventive steps.

Various different network technologies have been implemented for providing wireless connectivity for a mobile communication device. Some examples include global system for mobile communications (GSM)/general packet radio system (GPRS), wideband code division multiple access (WCDMA), high speed packet data (HSPA), worldwide interoperability for microwave access (WiMAX), and wireless local area network (WLAN).

Due to the explosion of data traffic on cellular radio networks, it is sometimes desirable to offload data traffic to a complementary network technology. Data offloading from cellular mobile networks to WLAN networks has been proposed as a solution for growing data amounts. WLAN networks are hotspot networks and thus not always available. Keeping a WLAN interface always on and scanning available networks can drain the battery in the user equipment ("UE"). Requiring the consumer to determine when to turn on and off scanning for available networks decreases the user experience as the user must switch the WLAN interface and scan feature on and off.

Even when handover between a 3GPP interface and a WLAN is implemented well, there can be a decreased user experience at the time of the handover. Thus, when performing data offloading, it can be desirable to limit the offloading to the user equipment that really needs to be offloaded from the mobile network. It is further desirable to offload to a WLAN network only when it makes sense (network congestion, high data amounts, bulk data applications).

Figure 5:
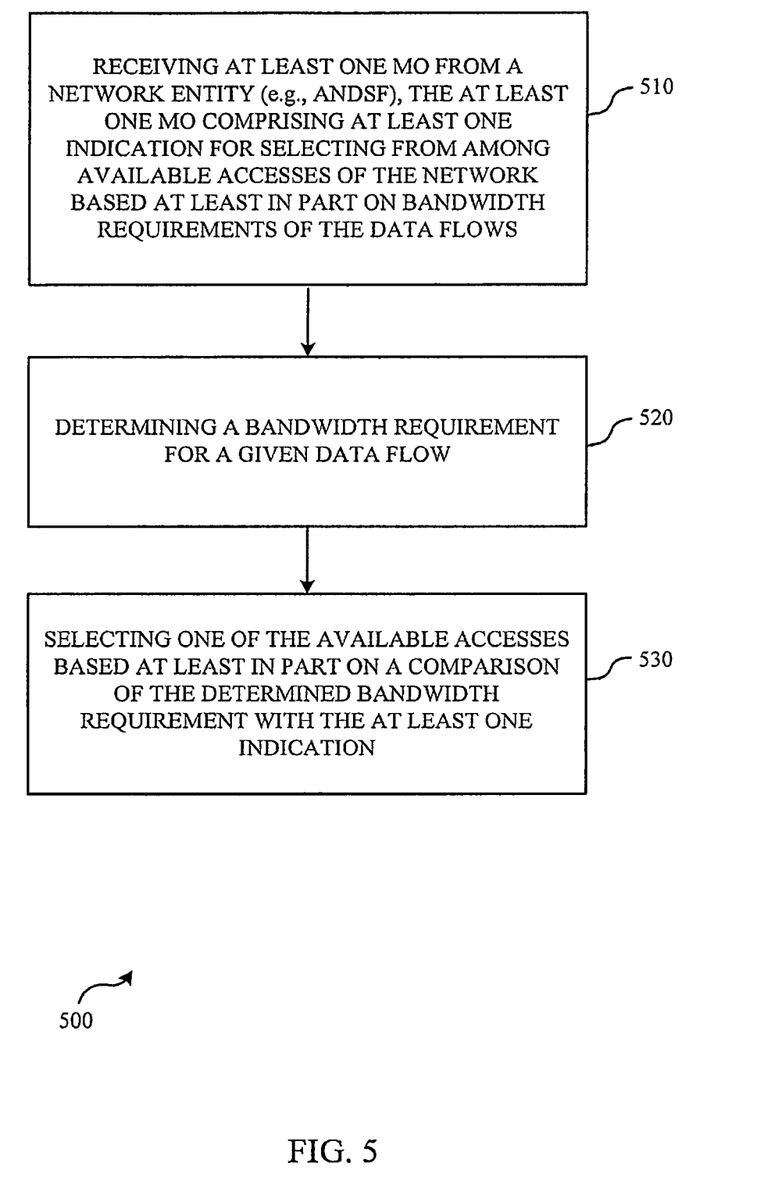
FIG. 5 is a diagram depicting ANDSF Management Object with its parameter diagram.

A number of approaches have been developed to facilitate transitions between different types of radio access technologies. The Access Network Discovery and Selection Function (ANDSF), for example, is a server that stores and provides inter-system mobility policy, routing policy, and access network discovery information. ANDSF provides user equipment (UE) with policies and access network selection information within a 3GPP access network. For example, the current ANDSF parameters for offloading g include WLAN SSIDs, frequencies, connection types, and data types. FIG. 5 is an example of an ANDSF Management Object with its parameters diagram.

Using the ANDSF, the mobile node learns which access networks are available and can decide to which of the access networks it attaches without scanning through the different implemented technologies and the frequency spectrum. The UE can query the ANDSF for information about access networks, including other non-3GPP access networks. Specifically, the standards documentation states, "It contains data management and control functionality necessary to provision network discovery and selection assistance data as per operators' policy. The ANDSF is able to initiate data transfer to the UE, based on network triggers, and respond to requests from the UE." (3GPP TS 23.402, section 4.8.2.1).

The ANDSF server can provide the UE with access network selection policies and/or discovery information. The UE can use the information to determine which access network to scan for and also to determine the operator policies with regard to a handover. The UE can decide to stay in any of the 3GPP access networks or to perform a handover to any of the non-3GPP access networks. Thus, the 3GPP standard describes that the ANDSF provides the access network selection information including other non-3GPP access networks. Other Open Mobile Alliance Device Management and similar protocols exist or have been proposed.

Generally speaking, ANDSF parameters are related to the access discovery and selection, but the prior art does not involve any guiding parameters specifying data amount as a criterion for using a complementary network for data offloading. In one embodiment of the invention, data amount based limits can be communicated to a terminal or UE for data offloading with ANDSF, OMA Device Management or other similar protocol. Based on the received limits, the UE monitors its own data traffic amount behavior, and uses both ANDSF parameters and its own traffic behavior knowledge when making the decision whether or not to try offloading data more aggressively. If the UE decides to offload more aggressively, it, for example, can increase the frequency in which the WLAN interface is turned on and used to scan for possible hot spots. Various embodiments of the invention can also include means for determining how to use the selected access network. This feature can be particularly relevant when the UE has more than one interface open via separate accesses.

In one embodiment, new offload parameters can be introduced in the ANDSF (or other protocol) which can be used to guide the UE behavior in a data dependent way. These parameters can be loaded at any time from the ANDSF server to the UE, even before they are needed. The UE may select how to use network access(es) in a preferred way based on the parameters and its own measures of data communication and/or behavior. In determining the data dependent ANDSF parameters, the network may involve communications between the ANDSF server, the subscription information in the Home Subscriber System (HSS) and/or policy information for routing and charging at a respective policy server.

In one embodiment the parameters can include data amount thresholds loaded to the UE. These data amount thresholds can be included as part of other ANDSF rules with regards to how to use different access networks. As an example, the data amount can indicate the average bit rate or the average packet rate at a certain period of time (e.g., 12:00-13:00), or in the last hour, or over any meaningful time interval. Based on the received data amount thresholds and other relevant ANDSF information, together with UE internal data amount counters, the UE can make the decision to switch on an alternate radio transceiver (e.g., WLAN radio) to scan for available accesses and to start using any suitable alternative access for data transmission. While embodiments of the invention mention using ANDSF parameters and information as an example of the means to assist and control the behavior of the UE with regards to the use of different access networks, other similar mechanisms can be used (e.g. pre-provisioning) with the added data amount parameters.

Figure 6:
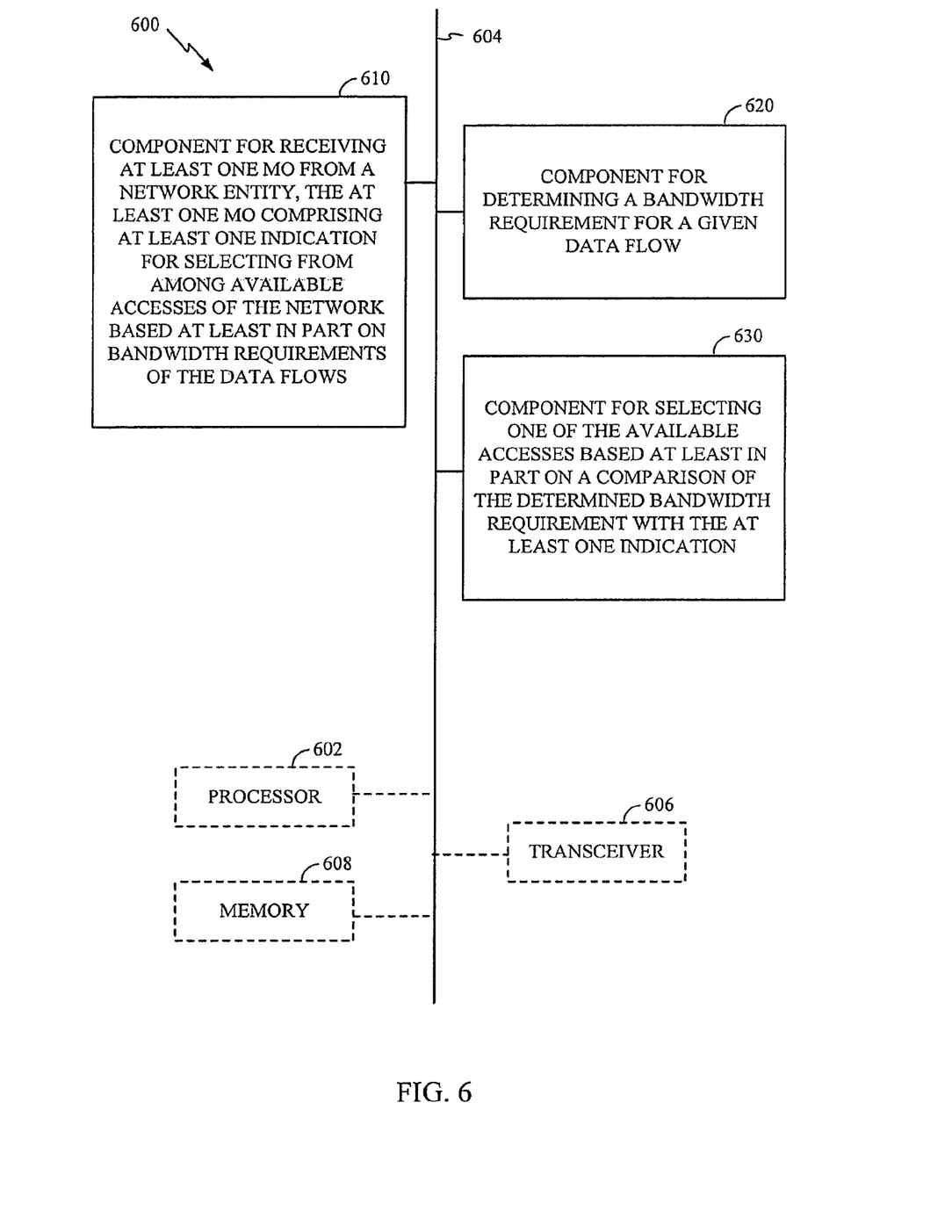
FIG. 6 is a diagram illustrating one system for implementing various aspects of one embodiment of the invention.

FIG. 6 illustrates one embodiment of a system for implementing various aspects of the invention. In this figure, a mobile device (UE) 72 is connected to a network (the Internet) 74 via two separate gateways: a packet data network gateway (PDNGW) 76 and a local access gateway (LGW) 78. The UE 72 includes an offload selection function 80 and a traffic profiler and data count function 82. The offload selection function 80 and or the traffic profiler and data count function 82 can be implemented as software resident in the UE 72. In one embodiment, the offload selection function 80 and traffic profiler and data count function 82 are implemented in a chip set in the UE 72. The traffic profiler and data count function 82 can measure a variety of information such, for example, amount of data, data rate, traffic flow, service type, application, port type, etc.

The Mobile Network Operator (MNO) core 84 includes a HSH 86 having subscription profile information, a Mobility Management Entity MME and Gateway Selection Function (GWSF) 88, and a Policy and Charging Rules Function (PCRF) 90. The Access Network Discovery and Selection Function (ANDSF) 92 on a server may be connected to the MNO core. The ANDSF 92 can include offload parameters and data amount thresholds which can be downloaded to the mobile device 72.

Figure 7:
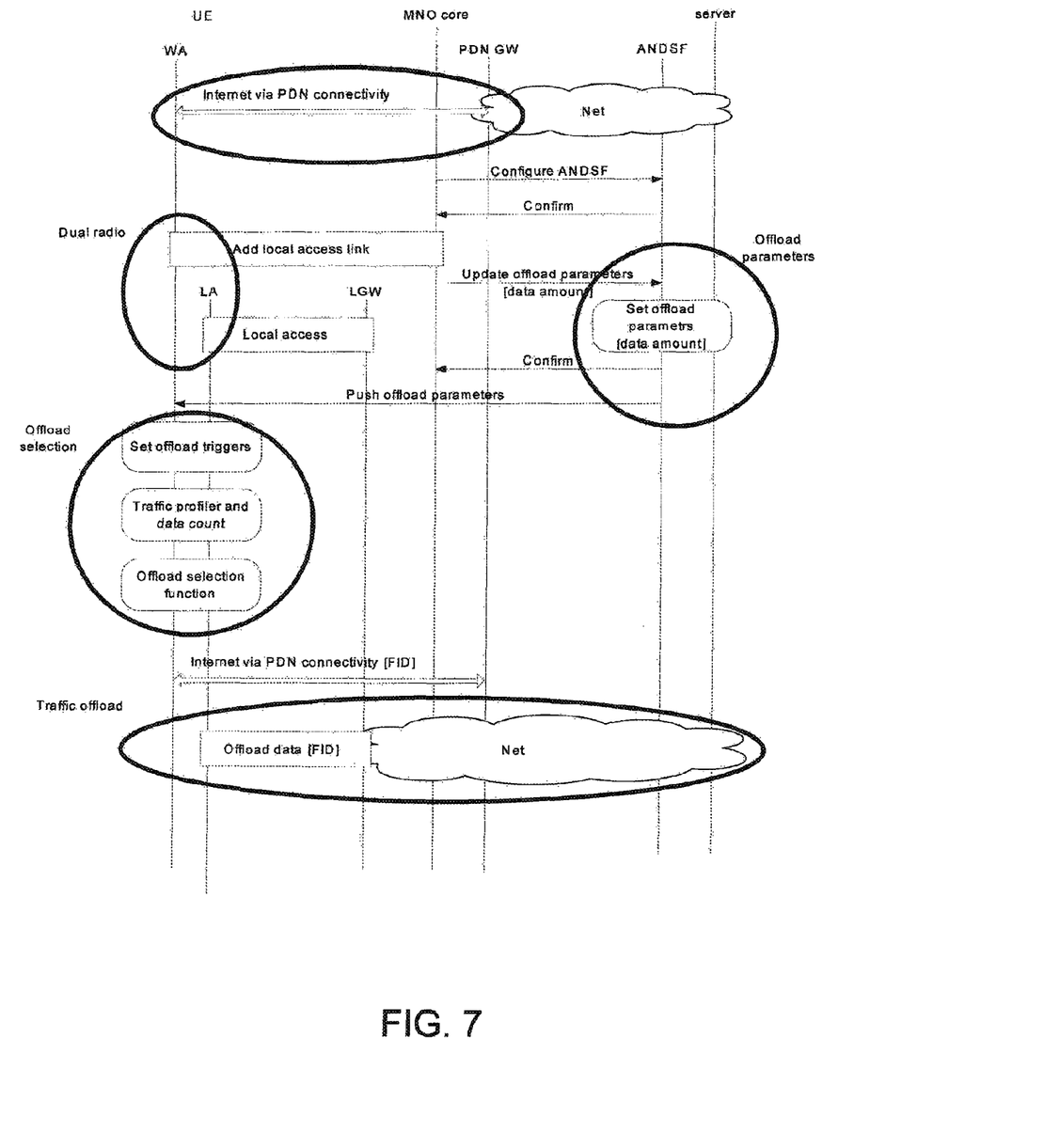
FIG. 7 is a communications flow diagram illustrating various aspects of one embodiment of the invention.

As shown in FIG. 7, the UE 72 connects to the Internet 74 via the PDNGW 76. The MNO core 84 then communicates with the ANDSF 92 which confirms the communication. The UE 72 also connects to the Internet 74 via the LGW 78. The MNO core 84 can communicate offload parameters such as data amount usage to the ANDSF 92 which can, in turn, set offload parameters such as data amount thresholds for the UE 72. These parameters can also be configured, loaded or programmed directly onto the ANDSF server 92 by the network operator (or a third party) or even automatically generated based on network statistics or network management (tuning) entities. The offload parameters can be pushed down to the UE 72 by the ANDSF 92 and the UE 72 can use these parameters to set offload triggers. The offload parameters can be pushed to the UE 72 via any of it Internet connections, typically using the PDNGW 76 connectivity. Loading of the offload parameters to the UE 72 can be done at any convenient time. In other words, offload parameter loading to the UE 72 does not need to happen at a time at or near when the offload parameters are expected to be used by the UE 72. The traffic profiler and data count function 82 and offload selection function 80 of the UE 72 can thereafter be used to determine whether to perform data offloading. In the case illustrated in FIG. 7, the UE 72 decides that offloading is appropriate and thus initiates data offloading by using the LGW 78 instead of the PDNGW 76 as its connection to the Internet 74.

Offloading can happen via a hard selection of one communication interface in the UE 72. As well, it is feasible according to various aspects of the invention that offloading can happen via multiple interfaces at the same time. As one sample embodiment of the invention, offload traffic can be directed via one communication interface and leaving the other, say conventional traffic, to another communication interface. In this situation, conventional traffic can be considered anything that is classified by a traffic profiler as not exceeding the offloading threshold or otherwise meeting an offloading criteria (offload trigger). Conversely, the offload traffic is any traffic that exceeds the offloading threshold or otherwise meets the offloading criteria. Offloading may be accomplished via a higher capacity, possibly costly, wide area network or it may be accomplished via a higher capacity, possibly lower cost, local or short range communication network. One of the offloading criteria could further be related to pricing, cost per bit of delivery, security or routing related reason.

Figure 8:
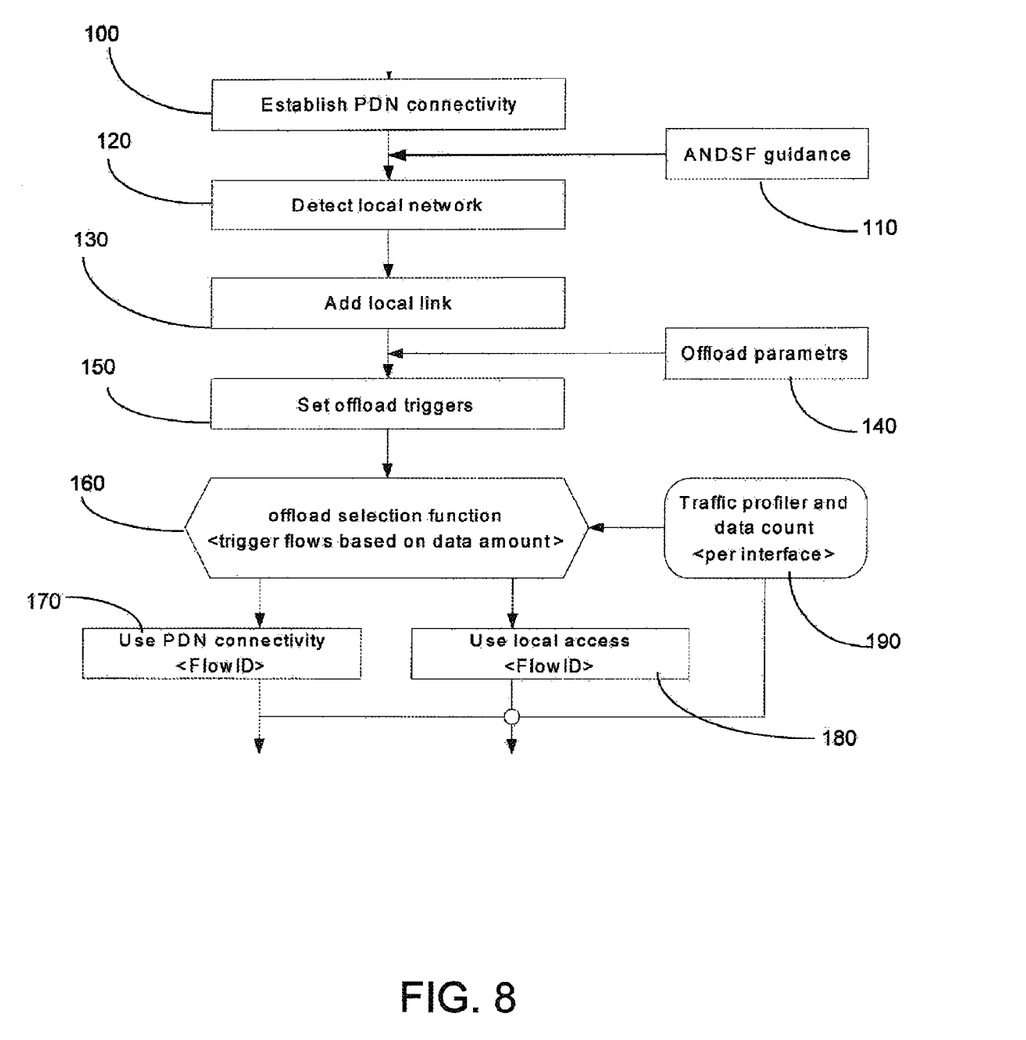
FIG. 8 is a flowchart illustrating one method for implementing various aspects of one embodiment of the invention.

FIG. 8 illustrates one embodiment of a method for implementing various aspects of the invention. As shown in FIG. 8, the UE establishes connectivity to a network via the PDNGW at 100. ANDSF guidance is provided at 110. The UE detects a local network at 120 and adds connectivity to the network via the LGW at 130. Offload parameters are downloaded to the UE at 140 and offload triggers are set in the UE at 150 based on the offload parameters. Offload desirability is made by the offload selection function at 160. The offload selection function decides to connect to the Internet either via the PDNGW at 170 or the LGW at 180. Data traffic and data count information can be fed back to the UE at 190. The order of many of these actions can occur in a different order. For example, it is possible to download the offload parameters to the UE via the PDN connectivity after 100, and before detections of 120. In this case, it is feasible to download the offload parameters with the other ANDSF guidance given in 110. The benefits of downloading the offload parameters after 130 include that the local access network is well known at the time and the offload parameters may be tailored or selected specifically according to that selected local network.

Without in any way limiting the scope, interpretation, or application of the claims appearing below, a technical effect of one or more of the example embodiments disclosed herein is increased data communication speed in a mobile device. Another technical effect of one or more of the example embodiments disclosed herein is a reduction in battery power consumption of a mobile device. Another technical effect of one or more of the example embodiments disclosed herein is increased efficiency in use of a wireless communication network. Still another technical effect is a decrease in unnecessary offloading attempts or data offloading generally. Another technical effect is an increase in operator control of data offloading.

Embodiments of the present invention may be implemented in software, hardware, application logic or a combination of software, hardware and application logic. In an example embodiment, the application logic, software or an instruction set can be maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIGS. 3 and/or 4. A computer-readable medium may comprise a computer-readable storage medium that may be any media or means that can contain or store the instructions for use by or in connection with an instruction execution system, apparatus, or device, such as a computer.

The various embodiments described herein are described in the general context of method steps or processes, which may be implemented in one embodiment by a computer program product, embodied in a non-transitory computer-readable medium, including computer-executable instructions, such as program code, executed by computers in networked environments. A non-transitory computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Additionally, the various embodiments may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, are described or otherwise mentioned herein, such references are not intended and should not be interpreted as limiting the scope of the following claims.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
    at least one processor; and
    at least one memory including computer program code, wherein the at least one memory and the computer program code are configured, with the at least one processor, to cause the apparatus to at least:
    receive data dependent offloading parameters at a mobile device, wherein the data dependent offloading parameters are related to at least one of cost per bit of delivery, security, and routing policy, and wherein the received data dependent offloading parameters comprise data thresholds;
    set an offload trigger based on the received data thresholds;
    measure at least a data usage of data in the mobile device; and
    offload data from the mobile device to a complementary network based on the measured data meeting or exceeding the offload trigger based on the received data thresholds of the received data dependent parameters related to the at least one of cost per bit of delivery, security, and routing policy.

2. The apparatus of claim 1, wherein the offload comprises the at least one memory including the computer program code is configured with the at least one processor to cause the apparatus to direct offload traffic via one communication interface of the mobile device and leave other traffic to another communication interface of the mobile device.

3. The apparatus of claim 1, wherein the at least one memory including the computer program code is configured with the at least one processor to cause the apparatus to measure at least one of the following: amount of data, data rate, traffic flow, service type, application, or port type.

4. The apparatus of claim 1, wherein the received data dependent offloading parameters are downloaded or uploaded to the mobile device as access network discovery and selection function parameters.

5. The apparatus of claim 1, wherein the at least one memory including the computer program code is configured with the at least one processor to cause the apparatus to measure data amount usage for a specific time period and determine whether to offload based on data dependent offloading parameters for the specific time period.

6. The apparatus of claim 1, wherein the at least one memory including the computer program code is configured with the at least one processor to cause the apparatus to switch on an interface at the mobile device for communicating with the complementary network in response to the offload.

7. A method, comprising:
receiving data dependent offloading parameters at a mobile device, wherein the data dependent offloading parameters are related to at least one of cost per bit of delivery, security, and routing policy, and wherein the received data dependent offloading parameters comprise data thresholds;
setting an offload trigger based on the received data thresholds;
measuring at least a data usage of data in the mobile device; and
offload data from the mobile device to a complementary network based on the measured data meeting or exceeding the offload trigger based on the received data thresholds of the received data dependent parameters related to the at least one of cost per bit of delivery, security, and routing policy.

8. The method of claim 7, wherein the received data dependent offloading parameters are downloaded or uploaded to the mobile device as access network discovery and selection function parameters.

9. The method of claim 7, wherein measuring data usage further comprises measuring data amount usage for a specific time period and wherein the offload is made based on data dependent offloading parameters for the specific time period.

10. The method of claim 7, further comprising switching on an interface at the mobile device for communicating with the complementary network and scanning for the complementary network.

11. The method of claim 7, wherein the measuring at least the data usage further comprises one of: measuring amount of data, data rate, traffic flow, service type, application, or port type.

12. The method of claim 7, further comprising setting the offload trigger based on the received data dependent offloading parameters.

13. A non-transitory computer-readable medium bearing computer program code embodied therein for use with a computer, the computer program code executed by at least one processor to perform operations comprising:
receiving data dependent offloading parameters at a mobile device, wherein the data dependent offloading parameters are related to at least one of cost per bit of delivery, security, and routing policy, and wherein the received data dependent offloading parameters comprise data thresholds;
setting an offload trigger based on the received data thresholds;
measuring data usage of data in the mobile device; and
offload data from the mobile device to a complementary network based on the measured data meeting or exceeding the offload trigger based on the received data thresholds of the received data dependent parameters related to the at least one of cost per bit of delivery, security, and routing policy.

14. The non-transitory computer-readable medium of claim 13, wherein the received data dependent offloading parameters are downloaded or uploaded to the mobile device as access network discovery and selection function parameters.

15. The non-transitory computer-readable medium of claim 13, comprising measuring data amount usage for a specific time period and wherein the offload is made based on data dependent offloading parameters for the specific time period.

16. The non-transitory computer-readable medium of claim 13, wherein the measuring at least the data usage further comprises one of: measuring amount of data, data rate, traffic flow, service type, application, or port type, and further comprising switching on an interface at the mobile device for communicating with the complementary network and scanning for the complementary network to offload.

17. The non-transitory computer-readable medium of claim 13, further comprising the offload trigger based on the received data dependent offloading parameters.

* * * * *